UNITED STATES PATENT OFFICE.

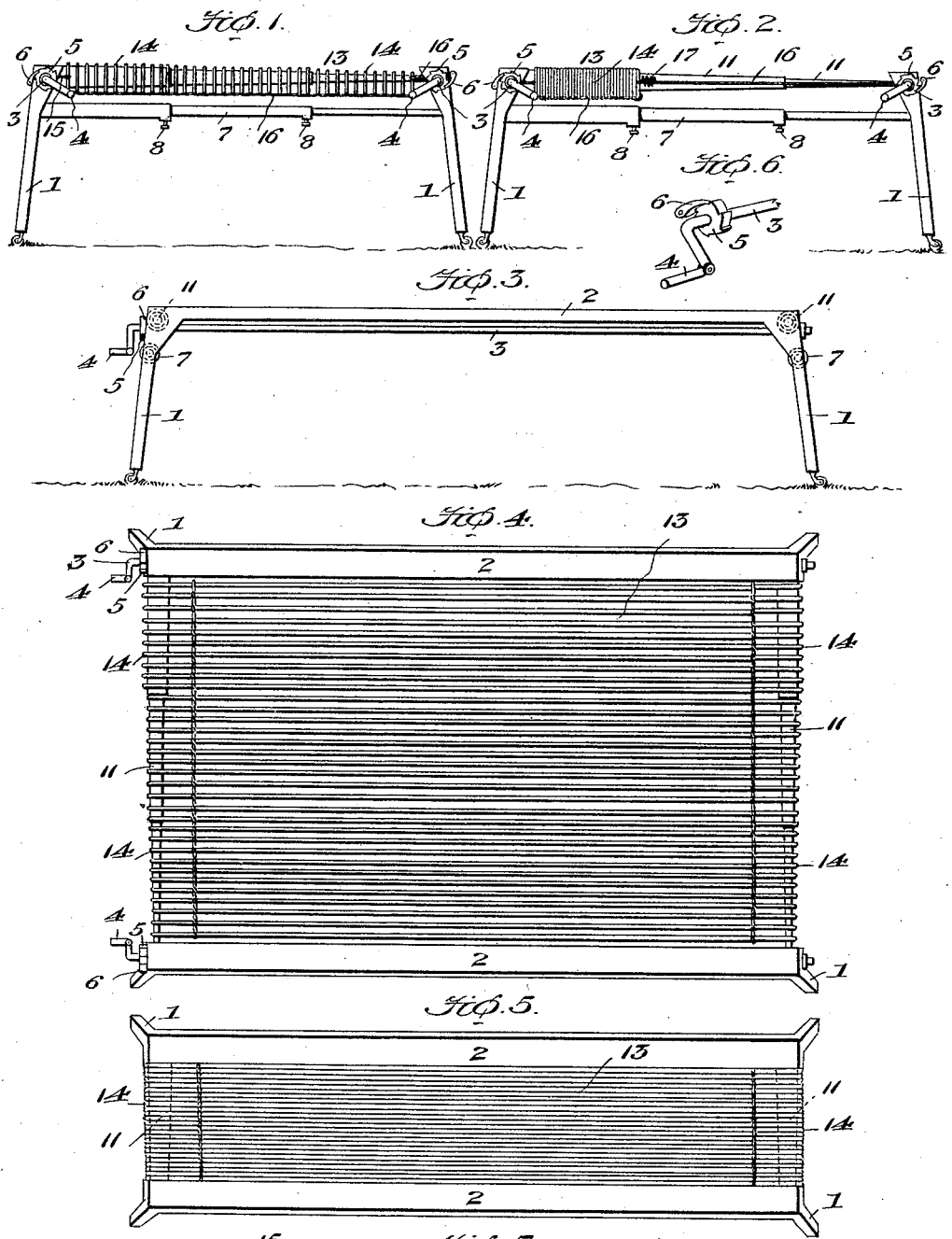

GEORGE A. SMITHWICK, OF METALINE FALLS, WASHINGTON.

COMBINATION BED AND COUCH.

1,063,613.  Specification of Letters Patent.   Patented June 3, 1913.

Application filed January 17, 1913. Serial No. 742,626.

*To all whom it may concern:*

Be it known that I, GEORGE A. SMITHWICK, a citizen of the United States, residing at Metaline Falls, county of Pend Oreille, and State of Washington, have invented certain new and useful Improvements in Combination Beds and Couches, of which the following is a specification.

This invention relates to combination beds and couches.

My object is to provide a bed having novel means whereby it may be folded or extended to adapt it for use as a full width bed and which will be strong, light, durable, having springs which will not sag whether the device is used as a couch or as a bed and which may be rapidly and easily extended or contracted and will remain in either condition without possibility of accidental change.

The invention is set forth fully hereinafter and the novel features are recited in the appended claims.

In the accompanying drawings:—Figure 1 is an end view with the bed extended; Fig. 2, a similar view with the spring bottom of the bed closed; Fig. 3, a side view; Fig. 4, a plan view with the bed extended; Fig. 5, a similar view showing the bed closed for use as a couch; Fig. 6, a detail of one of the winding shafts; Fig. 7, a detail view showing the means for operating the spring; and Fig. 8, a bottom detail of one of the sides of the bed.

The bed is supported by two pairs of angle iron legs 1 connected by an angle iron side bar 2, thus forming the two sides of the bed. Each of said sides carries a winding shaft 3 having a folding handle 4. The shafts 3 may be locked by ratchet wheels 5 carried thereby and pawls 6 on the sides for a purpose appearing hereinafter The sides of the bed are adjustably connected at the head and foot thereof by channel iron telescoping braces 7 composed of sections fitting one within the other and adapted to be secured by thumb clamping screws 8, as shown in Figs. 1 and 8, the end sections of the braces being secured to the sides of the bed. The sections of the braces 7 are provided with stops 9 so that they cannot pull out from each other, and flanges 10 are provided to prevent relative lateral displacement. The sides of the bed are also connected by tapering tubular telescopic sections 11, the end ones being secured to the sides of the bed, said sections having beveled ends 12 for a purpose appearing hereinafter.

Extending lengthwise of the bed is the spring bed bottom 13 which is composed of coiled steel wires having loops 14 which are slidably mounted on the telescopic tubular sections 11 which thereby constitute a guide and attaching means therefor. The bed bottom 13 is secured to one of the sides of the bed at 15.

Winding on the shafts 3 are straps 16 which have coiled spring connections 17 to the coiled wire constituting the bed bottom 13.

When the bed is to be used in its extended condition, one of the shafts 3 is let out and the other shaft 3 is wound up, the straps 16 thereupon stretching the bed bottom 13 to the full width desired, the eyes 14 meanwhile sliding on the tubular sections 11, but being prevented from catching thereon by the beveled edges 12. The set screws 8 are secured so that the sides of the bed are held rigidly apart. When the bed bottom 13 has been stretched to the full width, the pawl and ratchet mechanism is used to lock the winding shaft. The bed may be then used as a full width bed.

When it is desired to convert the device into a couch of relatively narrow width, the set screws 8 are loosened and the sides of the bed moved toward each other; the set screws 8 are then tightened and the other winding shaft is operated to wind the straps 16 thereon and bunch the spring bed bottom 13. The spring bed bottom does not wind upon the shafts 3 but is pulled open or closed by straps 16. The pawl and ratchet mechanism holds the spring bed bottom in either contracted or extended position.

Having thus described my invention, what I claim as new and desire to secure by Letters Patent, is:—

1. A convertible couch and bed having, in combination, relatively movable sides, winding shafts carried by said sides, locking means for the winding shafts, telescopic connections between the sides, an extensible and collapsible bed bottom, and connections to said bed bottom which are adapted to wind on the shafts, said bed bottom being collapsible or extensible between said shafts.

2. A convertible couch and bed having, in combination, relatively movable sides, telescopically arranged channel iron braces connecting the sides, means for locking the braces in different positions of extension or contraction, and an extensible and collapsible bed bottom.

3. A convertible couch and bed having, in combination, relatively movable sides, telescopically arranged channel iron braces connecting the sides, means for locking the braces in different positions of extension or contraction, telescopic guides connected to the sides, an extensible and collapsible bed bottom having parts slidable on said guides, and means on the sides adapted for extending or collapsing the bed bottom.

4. A convertible couch and bed having, in combination, relatively movable sides, telescopically arranged channel iron braces connecting the sides, means for locking the braces in different positions of extension or contraction, telescopic guides connected to the sides, an extensible and collapsible bed bottom having parts slidable on said guides, winding shafts on the sides between which the bed bottom moves, locking means for the winding shafts, and flexible connections adapted to wind on said shafts which are connected to the bed bottom.

In testimony whereof, I hereunto affix my signature in presence of two witnesses.

GEORGE A. SMITHWICK.

Witnesses:
A. D. BAKER,
E. LAMBRIGHT.

Copies of this patent may be obtained for five cents each, by addressing the "Commissioner of Patents, Washington, D. C."